United States Patent [19]

Kouloumbini et al.

[11] 4,222,510
[45] Sep. 16, 1980

[54] MUFFIN SEPARATOR AND MUFFIN HOLDER AND SAFETY GUARD

[76] Inventors: Aliki-Niki Kouloumbini, 4515 30th Ave., Astoria, N.Y. 11103; Ernest E. Anderson, 40 Chestnut St., Lakewood, N.J. 08701

[21] Appl. No.: 970,616

[22] Filed: Dec. 18, 1978

[51] Int. Cl.³ .............................................. B26F 3/02
[52] U.S. Cl. ...................................... 225/94; 225/97; 30/114; 99/537
[58] Field of Search ............... 225/93, 94, 97; 30/114, 30/363; 83/660, 761, 762, 870; 99/537

[56] References Cited

U.S. PATENT DOCUMENTS

| | | | |
|---|---|---|---|
| 844,287 | 2/1907 | Prouandie | 83/762 |
| 1,098,941 | 6/1914 | Collins | 83/762 |
| 2,429,756 | 10/1947 | Hartmann | 83/762 |
| 2,818,097 | 12/1957 | Glanz | 30/363 |
| 2,840,129 | 6/1958 | Jouis | 225/93 |
| 2,979,095 | 4/1961 | Jouis | 225/94 |
| 3,987,948 | 10/1976 | Peters | 225/97 |
| 4,069,581 | 1/1978 | Gray | 30/114 |

Primary Examiner—Harold D. Whitehead
Assistant Examiner—K. Bradford Adolphson
Attorney, Agent, or Firm—Charles E. Baxley

[57] ABSTRACT

A muffin holder and safety guard comprising a box-like member having an open end and dimensioned to receive a muffin separator therein. The holder and safety guard further includes means for releasably holding a muffin or like bakery product within the holder. When a muffin separator is inserted into the box-like member the muffin is impaled on prongs of the muffin separator, and when the muffin separator is withdrawn from the box-like member the muffin is released for subsequent separation.

2 Claims, 6 Drawing Figures

MUFFIN SEPARATOR AND MUFFIN HOLDER AND SAFETY GUARD

BACKGROUND OF THE INVENTION

The present invention relates to a combination of a muffin separator and a muffin holder and safety guard.

Muffin separators are known. See, for example, U.S. Pat. Nos. 2,818,097 to S. R. Glanz, 3,828,995 to J. E. Shorin et al. and 4,069,581 to R. E. Gray. These devices generally comprise a pair of hinged or relatively pivoted members each carrying a plurality of prongs. When the pair of hinged members are adjacent the prongs are aligned and a muffin or like bakery product is impaled on them. Then, the pair of hinged members, and the respective pluralities of prongs, are pivoted to a separated position and as the prongs separate they are effective to separate the muffin into two halves.

To effectively impale the muffin the prongs should terminate at sharp points. However, this creates a danger that a user of the device will run the prongs all the way through the muffin and impale his hand. A muffin tearing device wherein this danger is eliminated is disclosed in U.S. Pat. No. 2,840,129 to Jovis. This device includes a hinged assembly which separates into two halves. Each half has a relatively movable plurality of prongs and a stationary wall. When the two halves of the assembly are together a muffin fits between the two walls and the two pluralities of prongs are displaced to impale the muffin. Then the two halves of the assembly including the two pluralities of prongs are separated and the muffin is divided into halves. However, this device is complex, requires many parts and is thus costly.

SUMMARY OF THE INVENTION

It is accordingly an object of the invention to provide a muffin separator and a muffin holder and safety guard for use with the muffin separator which has simple structure and which is simple to use.

According to the present invention the muffin holder and safety guard is a box-like member having an open end and dimensioned to receive a muffin separator therein. The holder and safety guard further includes means for releasably holding a muffin or like bakery product within the holder. When the muffin separator is inserted into the box-like member the muffin is impaled, and when the muffin separator is withdrawn from the box-like member the muffin is released for subsequent separation.

DESCRIPTION OF THE PREFERRED EMBODIMENT

Figure 1:
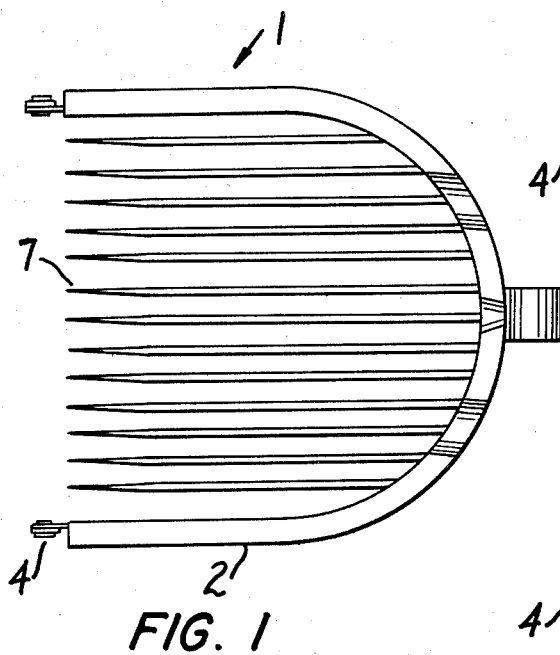
FIG. 1 is a plan view of a muffin separator for use in the present invention.
Figure 2:
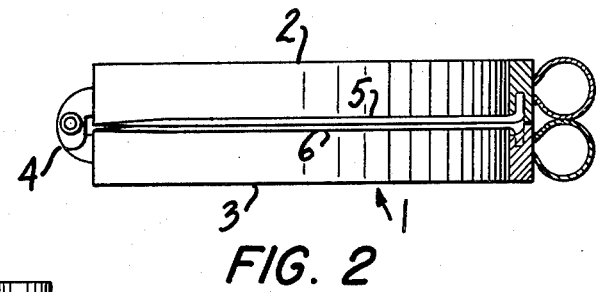
FIG. 2 is a sectional view of the muffin separator shown in FIG. 1 with its two halves adjacent.
Figure 3:
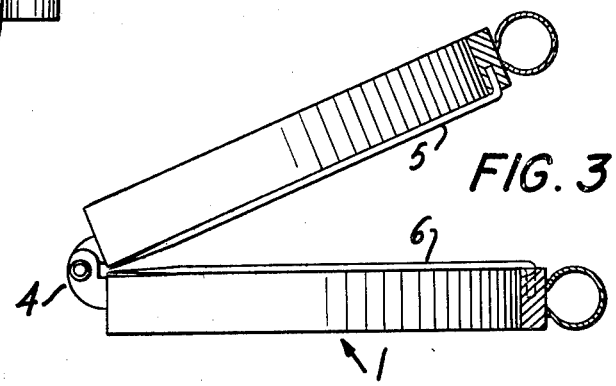
FIG. 3 is a sectional view of the muffin separator shown in FIG. 1 with its two halves separated.

A muffin separator 1 shown in FIGS. 1–3 is comprised of a pair of U-shaped open frames 2,3 connected by hinges 4 to allow them to pivot between an adjacent position as shown in FIG. 2 and a separated position as shown in FIG. 3. A plurality 5 of prongs 7 are carried by the U-shaped open frame 2, and a plurality 6 of prongs 7 are carried by the U-shaped open frame 3.

A muffin holder and safety guard 10 is comprised of a box-like member having upper wall 11, lower wall 12, side walls 13, 14 and rear wall 15. The box-like member 10 has an open front 16 which is slightly larger than the muffin separator 1 when the two U-shaped frames 2,3 are adjacent. The muffin separator 1 can be smoothly inserted into the box-like member and it extends sufficiently far so that the pluralities 5,6 of prongs 7 extend almost completely into the box-like member.

Figure 4:
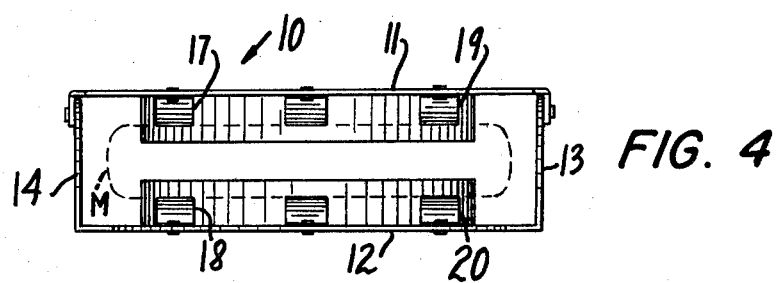
FIG. 4 is a front view of a muffin holder and safety guard for use in the present invention.
Figure 5:
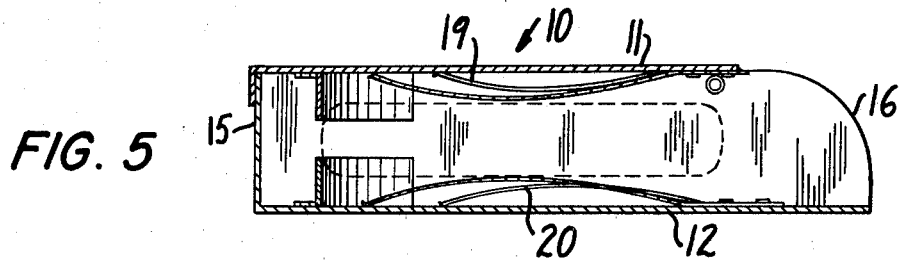
FIG. 5 is a sectional view of the muffin holder shown in FIG. 4.

The muffin holder 10 further comprises elongated resilient strips 17–20 within the box-like member on the top and bottom walls 11,12. A muffin M is inserted into the box-like member through the open front 16. As shown in FIGS. 4 and 5 the strips 17–20 are effective for holding the muffin M within the box-like member and aligned for being impaled by the prongs 7 when the muffin separator 1 is inserted through the open front 16 into the box-like member. Moreover, the strips 17–20 release the muffin M when the muffin separator 1 is withdrawn from the muffin holder and safety guard so that the muffin is impaled for being subsequently separated into two halves. Thus, after the muffin has been inserted into the muffin holder and safety guard it can be impaled on the separator and separated safely without risk of injury to the user of this device.

Figure 6:
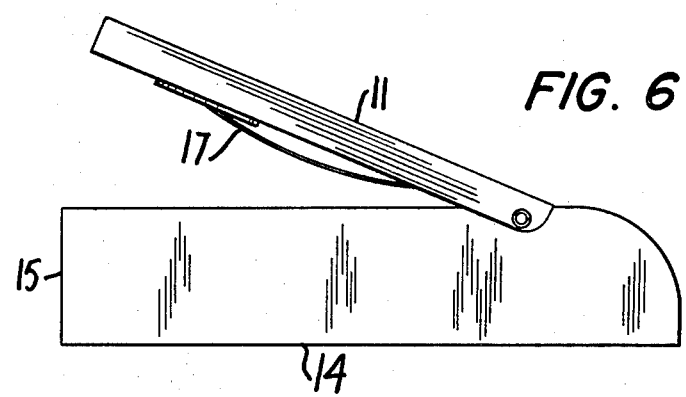
FIG. 6 is a side view of the muffin holder shown in FIG. 4 with its top wall raised.

The top wall 11 is hinged. As shown in FIG. 6 the top wall 11 can be raised to provide access to the inside of the box-like member for the purpose of cleaning it.

We claim:

1. The combination of a muffin separator for separating English muffins or like bakery products into halves, and a muffin holder and safety guard for use with the muffin separator; wherein said muffin separator is comprised of a hinged pair of generally U-shaped open frames, said frames each having a respective pair of spaced frame arms hinged together for pivoting between a position with the pair of frames adjacent and coincident and a position with the pair of frames separated, a plurality of prongs extending from each of said U-shaped open frames generally paralled with the frame arms and terminating at the open end of the frame, and said plurality of prongs on each of said U-shaped open frames being oriented to extend parallel to said plurality of prongs on the other of said U-shaped open frames when said pair of frames are in the adjacent position; and wherein said holder and safety guard is comprised of a box-like member having a top wall and an opposite bottom wall spaced a distance slightly greater than a height of said pair of frames when said frames are in the adjacent position for permitting said pair of frames to be inserted smoothly between said top wall and said bottom wall with said pair of frames adjacent, a pair of side walls spaced a distance slightly greater than a width of said pair of frames for permitting said frames to be inserted smoothly between said pair of side walls, said top, bottom and side walls defining a front opening for receiving said pair of frames in the adjacent position, a back wall opposite the front opening and spaced a distance from the front opening for permitting said pair of frames to be inserted into said holder and safety guard to permit said prongs to extend a substantial distance thereinto, and means for releasably holding a muffin or like bakery product within said holder and safety guard and positioned so that insertion of said pair of frames into said holder and safety guard with a muffin held therein is effective to impale the muffin on the prongs of said pair of frames and withdrawal of said pair of frames releases the muffin which remains impaled on said prongs for subsequent separation into halves upon pivoting of said pair of frames and the pluralities of prongs thereon from the adjacent to a separated position, said top wall of said box-like member is hinged to permit access to the interior of said box-like member.

2. The combination of a muffin separator and muffin holder and safety guard according to claim 1, wherein said means for releasably holding is comprised of enlongated resilient strips within said box-like member respectively disposed on said top wall and said bottom wall and extending toward the wall opposite the one on which they are mounted for releasably holding a muffin or like bakery product therebetween.

* * * * *